United States Patent Office 3,513,832
Patented May 26, 1970

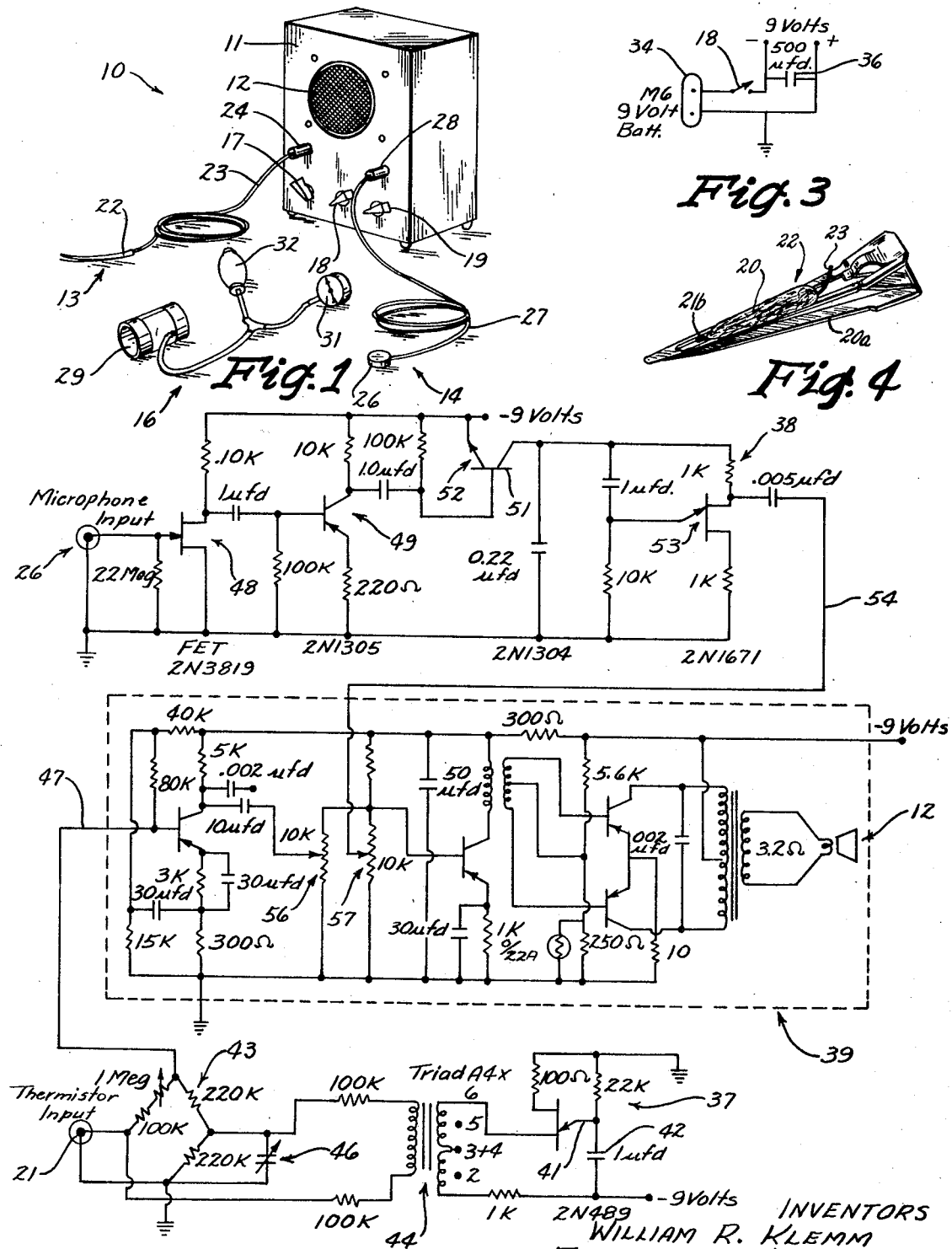

3,513,832
RESPIRATION AND CARDIOVASCULAR MONITORING APPARATUS
William R. Klemm, College Station, Tex., and Frederick B. Hembrough, Ames, Iowa, assignors to Iowa State University Research Foundation, Inc., Ames, Iowa, a corporation of Iowa
Filed Jan. 30, 1967, Ser. No. 612,624
Int. Cl. A61b 5/02
U.S. Cl. 128—2.05                           2 Claims

ABSTRACT OF THE DISCLOSURE

The disclosure relates to a monitoring apparatus comprising a thermistor probe for insertion into the nostril of a small animal, a skin contact microphone, and with both electrically connected to an amplifier arranged to simultaneously and selectively, to the listener, audibly indicate respiratory and the cardiovascular functions of the animal. Using a cuff and gauge, systolic and diastolic blood pressure can also be monitored.

BRIEF SUMMARY OF THE INVENTION

The apparatus described hereinafter permits monitoring of both respiratory and cardiovascular functions, simultaneously, in small animals during surgery. However, the applications need not be limited to surgery nor to small animals.

Respiration is monitored with a thermistor probe insered into the nostril. Thermistors change resistance as temperature changes; thus as warm and cold air alternately passes by the thermistor, its resistance changes and consequently a voltage output changes. This voltage output change is amplified and is heard as an amplitude-modulated sound. Pulse is monitored with a contact microphone, the output of which is amplified and delivered to a speaker. The tones of the two signals are sufficiently different so that both can be distinguished when heard together. This permits, for example, a veterinarian to listen to respiration and pulse changes simultaneously throughout surgery without being distracted from the surgery. Thus, the monitor provides means for quantifying respiration and heart rates, as well as systolic and diastolic blood pressures, and permits qualitative indications of changes in respiratory volume and pulse pressure, the functions monitored simultaneously.

BRIEF DESCRIPTION OF THE SEVERAL VIEWS OF THE DRAWINGS

The drawings show in perspective the housing for the electric circuitry and amplifier in connection with the probe and microphone, a blood pressure cuff and gauge, and show the electric circuit for te apparatus in detail.

DETAILED DESCRIPTION

This invention relates to a novel electronic detection apparatus, and more particularly to a detection apparatus for audibly indicating simultaneously the rate of the respiratory process and the pulse count of a living being.

The detection or monitoring device provides a means for quantifying respiration and heart rates, as well as systolic and diastolic blood pressures by indirect methods. Furthermore, the monitoring device provides qualitative, and again simultaneous if desired, indications of changes in respiratory volume and pulse pressure.

In the care and treatment of patients, whether human or animal, it is of the utmost importance to monitor with care the respiratory action and the pulse rate of the patient to provide a prompt and reliable warning or alarm when either function changes. This is especially so during surgery, and becomes acute when inadequately trained or even, as is the case at times with veterinary surgeons, no assistants or attendants are present.

Only one quantitative method is known for monitoring respiration, that including the use of the spirometer. Known qualitative methods include the use of a strain gauge, an impedance pneumograph, a contact microphone, and a thermistor. The use, of course, of a cardio-sphygmograph for recording the amplitude and frequency of a patient's heart action is known. Due to the complexity and high cost of these instruments, many are limited to use by institutions or specialized groups, being almost never used in an individual veterinary practice.

It is, therefore, an object of this invention to provide a new and novel respiration and cardiovascular monitor for use particularly, but not limited thereto, by the practicing veterinarian.

It is another object of this invention to simultaneously monitor respiration and cardiovascular functions.

It is yet another object of this invention to provide a respiration and pulse monitor capable of signalling the unassisted practitioner of any alarming acceleration or deaccelerations of these two important body functions.

Still another object of this invention is to provide a monitor which requires the minimum amount of attention after commencing surgery.

Another object of our invention is to provide a monitor which signals not only pulse count, but also gives the operator a quantitative evaluation of the patient's blood pressure.

Yet another object of this invention is to provide a respiration and pulse count monitor that will function either simultaneously or independent of the other.

It is still another object of this invention to provide a pulse and respiration monitor that is simple and economical to manufacture, extremely compact and functional in use, but rugged in construction.

The foregoing and other objects, advantages, and characterizing features of our invention will become clearly apparent from the ensuing detailed description taken in conjunction with the accompanying drawings, wherein:

FIG. 1 is a perspective view of the invention showing the speaker and circuit chassis connected to the respiration and pulse count transducers: a sphygmomanometer apparatus also being shown;

FIG. 2 is a schematic diagram of the electrical circuit of the invention shown in FIG. 1;

FIG. 3 shows the power relay source to the circuit; and

FIG. 4 is a perspective view of the thermistor mounting arrangement.

The monitor of this invention, illustrated generally at 10 in FIG. 1, comprises a chassis cabinet 11 for the electric components, shown in detail in FIGS. 2 and 3, and for housing the speaker 12, a respiration transducer 13, a pulse count transducer 14, and a blood pressure unit 16.

Specifically, the cabinet 11 is an encloseable box, having a hinged rear (not shown) for example, for access to the interior thereof, having an opening for the face of the speaker 12, and provided with a trio of rotatable knobs 17, 18 and 19, for respiration gain control main ON-OFF and pulse gain control, and thermistor balance control, respectively.

The respiration transducer 13 comprises a thermistor 21, shown electrically in FIG. 2, mounted by the use of silicone rubber 20 (FIG. 4) on an elongated, thin piece of metal, such as a woman's hair pin 20a to form a probe 22. The tip 21b of the thermistor is partially enclosed, but sufficiently exposed so that free air flow occurs. The thermistor 21 is connected by a lead 23 to a plug 24 for insertion into an appropriate jack on the chassis housing 11.

Should the thermistor 21 be desired for use, as described hereinafter, during inhalation anesthesia, it could be mounted in a small tube which inserts into the side of an endotracheal tube. Only the tip of the thermistor 21 needs to be inside of the tracheal tube. The thermistor 21 does not function well in any closed system which does not allow significant temperature change with breathing.

The pulse count transducer 14 (FIG. 1) comprises a sound microphone 26 connected by a lead 27 to a plug 28 for insertion into an appropriate jack in the housing 14. The blood pressure unit 16 comprises a metal tubular cuff 29, a calibrating pressure gauge 31, and a sphygmomanometer bulb 32, the use of which will be described hereinafter.

Referring particularly to FIGS. 2 and 3, the circuitry for the monitor 10 is provided, FIG. 3 showing that apparatus can be powered by a commercially available 9 v. battery 34, the negative side having the main switch 18 interposed, the positive side grounded, and with a capacitor 36 connected therebetween. The values indicated for the circuit components are those preferred, and are not meant to be limitations thereon.

Broadly speaking, the signals from the respiration and pulse transducers 13 and 14, respectively, are used separately to amplitude modulate the frequency generated in two relaxation oscillators indicated generally at 37 and 38 (FIG. 3). The oscillations are fed into an audio amplifier, indicated generally at 39, and shown in a dotted box, and, by adjusting their volume, can be heard either mixed simultaneously or separately. When mixed, their tone values are such that they can readily be identified.

In the respiration channel at the bottom of FIG. 2, the unijunction transistor 41 produces 300-cycle oscillations from cyclic charge and discharge of the capacitor 42 in the emitter circuit. This relaxation oscillator 37 powers the bridge 43 through the transformer coupling 44. The output amplitude of these oscillations from the bridge 43 is modulated by the changing resistance in the thermistor arm of the bridge, with the variable capacitor 46 in the bridge being essential for balancing the thermistor cable capacity. The capacitor 46 used here, an Arco 304 (50–400 pf.), is adequate for a 5-foot cable, and is tied to the knob 19 (FIG. 1) for setting purposes.

The thermistor 21 should be moisture-proof, have a high enough resistance to permit bridge balancing, and have a high resistance ratio. The output is then coupled to the input lead 47 of the audio amplifier 39. Amplifier 39 is commercially available, manufactured by Midland, No. 13–615.

The pulse channel at the top of FIG. 2 operates by initial coupling of the microphone voltage to a field-effect transistor 48, the main function of which is to provide high input impedance matching for the microphone 26. The output from the field-effect transistor 48 is then amplified through transistor 49. The output from the transistor 49 is fed to the base 51 of transistor 52 acting as a switch to turn on and off the supply voltage to the unijunction transistor 53 of the oscillator 38. The unijunction 53 produces 200 cycle oscillations in a manner similar to that described for the unijunction 41 in the respiration channel.

The output of the pulse channel is then coupled to the input lead 54 of the audio amplifier 39. With the amplifier connected to the speaker 12, the latter for example being a 3.2 ohm, 4″ speaker, by regulating the variable resistances 56 and 57 by the respiration knob 17 and pulse gain knob 18, respectively, the respective amplitude-modulated sounds from the speaker 12 can be controlled to transmit either one or both sounds. The veterinarian can thus monitor either one or both sounds at his discretion.

To monitor respiration, the thermistor probe 22 is plugged in, the gain control knob 17 adjusted until a hum is heard, and the balance knob 19 adjusted to produce minimum volume. This balances the thermistor 21 for room temperature. As a result of such positioning of the probe 22, increases from the animals exhaled air will be registered by increased sound. The thermistor probe 22 should be placed in the nasal orifice of the animal.

For blood pressure and pulse monitoring, the occluding cuff 29 is placed over the base of the tail of the animal; about an inch distally, and the microphone 26 is taped tightly to the ventral surface. It is not essential to clip the hair, but some readjustments in microphone position may be necessary. The lead wire 27 adjacent to the tail should also be taped to minimize noise due to motion of the microphone 26. Finally, the pulse gain control knob 18 is turned until the pulse sound is adequate. To measure blood pressure, one simply pumps up the occluding cuff 29 until the pulse sound disappears. Blood pressure is determined by gradually releasing the pressure in the sphygmomanometer bulb 32 and observing the pressure reading at the point when pulse sounds return. The first onset of pulse sounds marks the systolic pressure and the point at which sounds become maximal indicates the diastolic pressure.

In clinical tests, reproducibility of blood pressure determination was quite good. In a test of this aspect, ten readings were taken from an anesthetized, forty two pound dog. Measurement bias was reduced by having one man detect the sounds and another observe the gauge 31 reading. The standard deviation from the mean of these readings was only ±1 mm. Hg for both systolic and diastolic pressures.

Tests were conducted on another dog (thirty-seven pound mongrel), comparing direct carotid pressures with indirect tail pressures obtained with the monitor 10. Direct recording was accomplished with a Statham P23AA pressure transducer and a pen recording system. Extremes of blood pressure were produced by injection of amphetamine and over-dose of sodium pentobarbital. The results indicated a high degree of correlation between direct and indirect methods. The indirect pressures were always lower than the direct carotid pressures, especially in the lower pressure ranges. Linearity was also quite prominent, except in the low pressure ranges. The least accuracy was obtained with diastolic indirect values in the low pressure ranges.

A similar linear relation between direct carotid and indirect tail pressures in dogs had been reported to the inventors, wherein the pressure range that was monitored was 50–250 mm. Hg. Such a relation was concurred in, in that tail pressure was always lower than direct carotid pressure. However, at low pressures, there was no downward bending of the curve as in the present investigations. This may be explained by the lower pressure range used in the present study and by the loud-speaker monitoring, as opposed to oscilloscope monitoring in the previous study. A linear relation was noted in another study in which direct brachial artery pressures were compared with indirect brachial pressures in dogs. This study, however, did not include diastolic measurements nor measurements at low blood pressures.

The monitor 10 was also used to conduct tests on the feasibility of determining pressure from points other than the tail. Both hind and forelimb pressures were readily obtained, using bag-shaped cuffs made of thin rubber or plastic and sealed with rubber cement. The metal tubular cuffs used on the tail were too small to slip over the paw of larger dogs. The limb cuffs measured 10 x 18 cm. and were applied by wrapping around the upper limb and securing with tape. The microphone was taped over the dorsal paw. Results from seven anesthetized dogs revealed no consistent differences between the tail and hind-leg pressures. However, the pressure at the forelimb averaged 1⅙ mm. Hg higher, with a 1% significance level for systolic pressure and 0.5% for diastolic.

The feasibility of using the monitor for pressure measurements in unanesthetized dogs was also tested in seven young adults weighing 24–38 pounds. The results indicated that either forelimb or tail measurements could be obtained; however, motion artifacts were sometimes a problem. The tail or forelimb had to be kept motionless during the measurement. When dogs were panting, it was impossible to obtain forelimb measurements, but tail measurements were still obtainable. High pressures before anesthesia may have been due to excitement, because the dogs were brought into an unfamiliar room and placed on an examination table. The pressure drop as the depth of anesthesia was increased was quite distinct in each dog.

Other workers have advocated clinical use of indirect blood pressure in unanesthetized dogs. In one study, the average indirect brachial pressure was 142 (range 104–180). However, the study included puppies and very old dogs and no segregation of data by age was reported. Both reports commented on problems with motion artifact, but one pointed out that brachial placement caused more problems than tail placement.

The monitor 10, in addition to numerous demonstrations, has been systematically tested throughout long surgery, periods by veterinary surgeons in a small animal clinic, where it was used during at least eighteen operations.

Some of the problems noted during surgical monitoring included the observation that in dogs with short tails, the cuff 29 used was so long that the microphone 26 was necessarily placed too distally for good pulse pickup. In such cases, brachial monitoring was an adequate remedy.

The surgeons, using the monitor 10 also noted a tendency for the pulse to be "lost" during very long periods of surgery. This problem was greatly minimized by taping a tightening device on top of the microphone 26. Such a device was made, consisting of a bolt with a metal plate on the end which rested on top of the microphone 26; the bolt turned in another metal plate which was anchored under tape. Thus as the bolt was turned, the tape was tightened and simultaneously more pressure was put on the microphone 26. In operation, the bolt was turned until the pulse became audible. Theoretically, excessive tightening could damage the microphone 26, although this was not a problem with the particular microphone employed. A simple way to make such a device is to use a standard laboratory screw clamp for rubber tubing. The frame in which the screw turns is partially cut off and the remainder is mounted to a plate of metal of sufficient size for convenient taping in place. One limitation of the pulse pickup is the noise which occurs during vigorous movements, in the region of the microphone 26. Taping the microphone leads 27 reduces this noise.

We claim:

1. A respiration and cardiovascular monitoring device for veterinarian use with an animal comprising:
   first means attachable to the animal responsive to the temperature variance of respiratory air, said first means comprising a thermistor mounted by the use of silicone rubber on an elongated piece of metal to form a probe, with the tip of the thermistor exposed;
   second means attachable to the animal responsive to the pulse of the animal, said second means comprising a sound microphone;
   first electrical means electrically connected to said first means for transforming said temperature variance into an electrical output which is proportional to the changes in temperature, said first electrical means comprising a relaxation oscillator, a transformer connected to said oscillator, and a Wheatstone bridge powered by said oscillator through said transformer, and with said thermistor interposed in one arm of said bridge, the bridge transmitting an output amplitude of a predetermined value to said amplifier means in direct ratio to the changing resistance of said bridge thermistor arm as determined by the variance of said thermistor due to the temperature variance of the animal's respiration air;
   second electrical means responsive to said second means for transforming said pulse into an electrical output which is proportional to the changes in pulse intensity;
   amplifier means for receiving and respectively amplifying both outputs; and
   speaker means for simultaneously transforming said amplified outputs into respective sound waves audible to the human ear.

2. A respiration and cardiovascular monitoring device as defined in claim 1, and further wherein said second electrical means comprises means electrically connected to said sound microphone for providing a high input impedance matching for said microphone means for amplifying the output of said input impedance matching means, unijunction transistor means for providing an electrical output to said amplifier means having a predetermined value, and means interposed between said output amplifying means and said unijunction transistor for controlling the supply voltage to the latter.

References Cited

UNITED STATES PATENTS

| | | | |
|---|---|---|---|
| 3,002,185 | 9/1961 | Bases | 128—2.05 X |
| 3,199,508 | 8/1965 | Roth | 128—2.06 |
| 3,232,288 | 2/1966 | Krobath | 128—2.08 |
| 3,253,588 | 5/1966 | Vuilleumier et al. | 128—2 |
| 3,347,233 | 10/1967 | Pacela | 128—2.1 |

WILLIAM E. KAMM, Primary Examiner

U.S. Cl. X.R.

128—2.08